S. B. H. VANCE.

Apparatus for Suspending Gasoliers and Drop Lights.

No. 4,236. Reissued Jan'y 17, 1871.

Witnesses.
H. C. Heustis
Edmund Masson.

Samuel B. H. Vance.
By atty A. B. Stoughton.

N. PETERS, Photo-Lithographer, Washington, D. C.

United States Patent Office.

SAMUEL B. H. VANCE, OF NEW YORK, N. Y., ASSIGNOR TO MITCHELL, VANCE & CO., OF SAME PLACE.

Letters Patent No. 70,653, dated November 5, 1867; reissue No. 4,236, dated January 17, 1871.

IMPROVEMENT IN APPARATUS FOR SUSPENDING GASOLIERS AND DROP-LIGHTS.

The Schedule referred to in these Letters Patent and making part of the same.

*To all whom it may concern:*

Be it known that I, SAMUEL B. H. VANCE, of the city, county, and State of New York, have invented certain new and useful Improvements in means and in the arrangement of means for Suspending Gasoliers and Drop-Lights; and I do hereby declare that the following is a full, clear, and exact description of the same, reference being had to the accompanying drawing making a portion of this specification, in which—

Similar letters of reference indicate corresponding parts in both figures.

Figure 1:
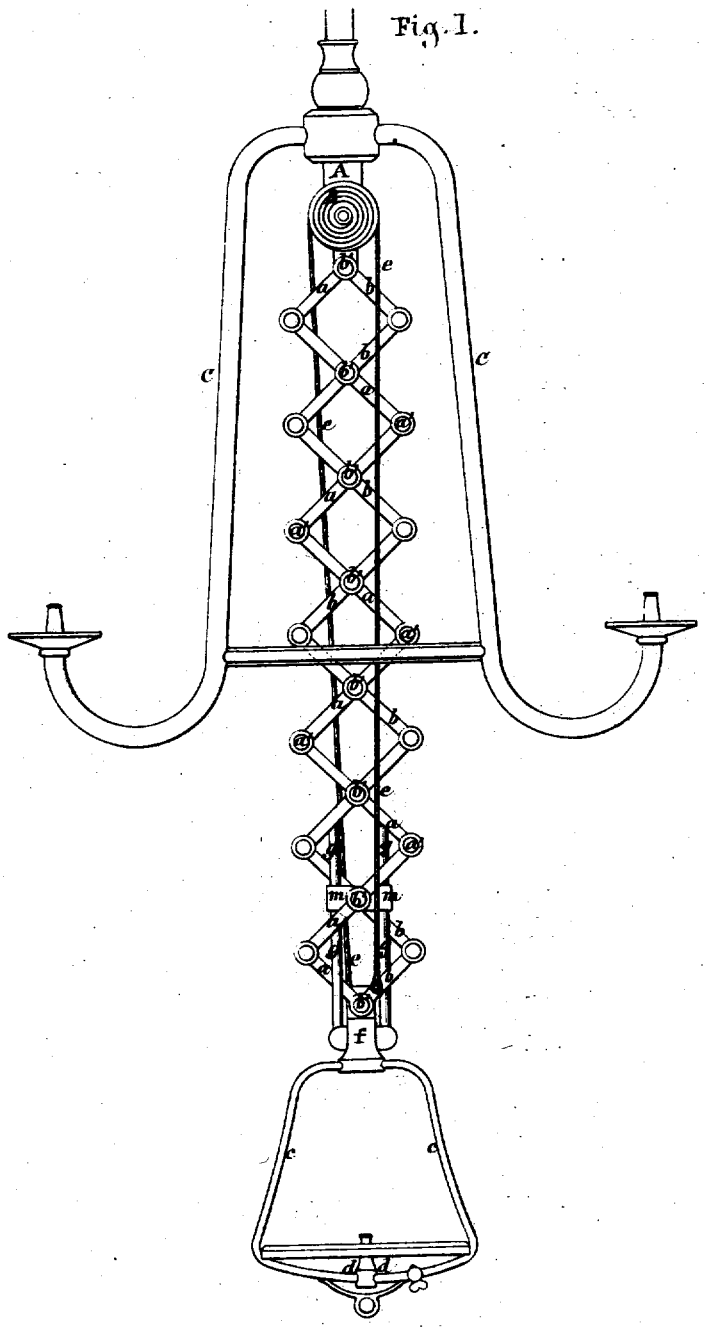
Figure 1 is a side view of an apparatus constructed according to my invention.

I am aware that tubes or pipes have been connected by joints so that, while the tubes might turn on or by means of the joints, still the passage through them would be kept open. This I do not, of course, lay any claim to.

My invention consists in uniting and combining a series of tubes and joints in an elongated form, so as to make a continuous but tortuous gas-way or passage through them, said tubes in their elongated form crossing each other's line or path from right to left, and from left to right, so as to form a hollow or tubular lazy-tongs, capable of extending from the ordinary height of a chandelier to or near to a table of ordinary height, and thus constitute a drop-light in connection with a chandelier or gasolier.

My invention further consists in arranging and combining, centrally, in relation to two or more permanent gas-lights or burners a drop-light, the gas-way or passage to which is through an elongated series of tubes and joints, which tubes cross each other's path from right to left and *vice versa*, said tubes and joints being self-supporting, and forming a support for a drop-light attached to and connected with them.

My invention further consists in guides near the drop-light, to steady and support said drop-light as well as the tubular lazy-tongs to which the drop-light is attached.

To enable others skilled in the art to make and use my invention, I will proceed to describe the same with reference to the drawing.

Short lengths or sections of tubes are indicated, respectively, at *a* and *b*—one set or series, as at *a a*, running from left to right, and so on, and the other set or series running from right to left, and so on, and crossing each other's zigzag or tortuous path, and constitute the arms of a system of lazy-tongs that will be hereafter more particularly described.

The sections marked *a* are jointed or pivoted together at their ends by joints *a'*, which allow the tubes or sections to move on each other but at the same time keep the gas-passage through them open.

These sections *a*, as seen in fig. 1, starting from the main gas-pipe A, extend from right to left, and from left to right, in a zigzag and inclined path, except at the joints *a'*, where they change for a short distance from an inclined to a lateral horizontal position or nearly so.

The other sections *b*, starting from the same gas-pipe A, extend from lef to right, and from right to left, and are connected at their ends by joints, upon which they may turn and still maintain the gas-way or passage through them.

The sections *b* also descend in a zigzag line, crossing the path of the other series *a*, and, like those *a'* where jointed, the gas-way is for a short distance horizontal or nearly so.

Where the two series of tubes *a b* cross each other's path or line they are pivoted or jointed together, as shown at *b'*, so that said sections constitute a series or system of lazy-tongs, which may be shortened or elongated at pleasure, and, at the same time, they constitute a frame or structure within themselves, capable of sustaining a drop-light burner attached to them, without the use or interposition of a frame independent of the tubes, as heretofore practiced.

Figure 2:
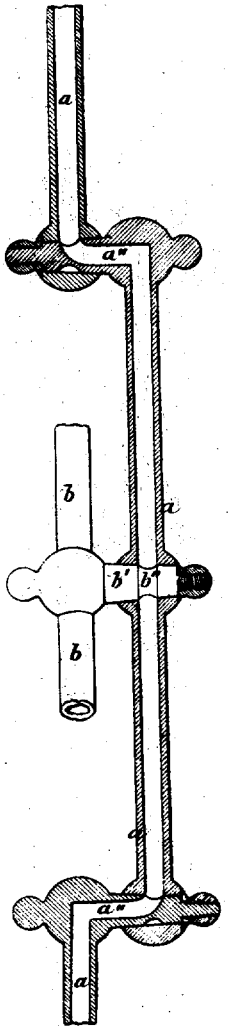
Figure 2 is a detached view of a portion of the same, partly in section, and on an enlarged scale.

The two series of tubes *a b* and their joints form an oblong figure or square, with long sides and short ends, as seen in fig. 2, and thus are rigid enough to constitute a frame capable of being moved and of holding a drop-light burner without undue swaying, which would make a flickering light.

The sections *a* are held together and communicate with each other by means of openings *a''* in the pivoting-spurs or joints *a'* thereof, and have orifices *b''* formed in the spurs or joints *b'*, by which they are connected with the sections *b*, so that by this means a continuous passage is formed throughout the entire length of the series or lazy-tongs system.

The upper end of the gas-way or passage communicates with the gas-supply pipe A, from which the lazy-tongs, or rather the apparatus itself, is suspended, while the lower end of such passage communicates with a short tubular stem, *f*, with the branch-pipes *c* which support the burner *d* of the drop-light, the gas being thus enabled to pass when desired, and without interruption, from the pipe A to the burner just mentioned, whether the lazy-tongs or extensible portion of the apparatus be elongated to a greater or less degree.

That the lazy-tongs may be held stationary at any desired position two fusees, B, are provided; one upon each side of the gas-pipe A, and each connected with the lower end of the lazy-tongs by a cord, *e*, the said fusees being furnished with internal springs so applied and of such stiffness as to cause the cords *e* to be wound upon such fusees when the lazy-tongs are shortened, and to exert sufficient tension upon the said cords to counterbalance the weight of the apparatus, thus insuring the required retention of the said apparatus with its burner at a greater or less distance from the end of the gas-pipe A.

And to insure the retention of the burner *d* in proper position with reference to the lazy-tongs or extensible portion of the apparatus, the stem *f*, by which the branch-pipes *c* are connected with the gas-passage, hereinbefore mentioned, of the lazy-tongs, has attached to it two upwardly-extending parallel rods, *g*, which pass through slots formed in the ends of a cross-head, *m*, attached to one of the central pivots, *b*, said rods constituting guides which hold the burner in proper position with regard to the other parts of the apparatus, and which, sliding through the slots in the cross-head *m*, permit the burner to be raised or lowered without requiring the stem *f* to be made of any considerable length, as would be the case if the said stem were made to slide with reference to the said guides.

When desired, the gas-pipe A may be provided with a fixed gasolier, as indicated at *c* in fig. 1, and the apparatus herein described situated centrally within the gasolier, as shown in said drawing.

It will be perceived that, instead of supporting the lazy-tongs by a frame-work connected with them, as heretofore done, I so construct the lazy-tongs by joints that will not slip apart as that said lazy-tongs constitutes also its own frame, and thus dispense with an elongating frame.

Having thus fully described my invention,

What I claim therein as new, and desire to secure by Letters Patent, is—

1. The combination of a series of tubes and connecting-joints in an elongated and tortuous line, and crossing each other's paths as they descend, and so connected as to form a continuous gas-passage, as also a frame capable of supporting a drop-light burner without the use of an additional frame, substantially as described.

2. In combination with two or more stationary burners, a drop-light, centrally arranged in relation thereto, when said drop-light is suspended to and sustained by a system of lazy-tongs, that not only furnish a continuous and tortuous gas-passage, but also forms within itself a frame of sufficient rigidity to sustain said drop-light, substantially as described.

3. In combination with the series of tubes and joints forming a gas-way capable of being elongated, substantially as described, and a drop-light suspended thereto and sustained wholly by said frame-work of tubes and joints, the guides and cross-head, substantially as and for the purpose described.

Witnesses: SAML. B. H. VANCE.

JULIUS J. J. KAYSEL,

EDWARD KAYSEL.